A. HITCHCOCK.
MODE OF ATTACHING FOOT-TREADLES, &c.

No. 188,739. Patented March 27, 1877.

Witnesses:

Inventor:
Alonzo Hitchcock

UNITED STATES PATENT OFFICE.

ALONZO HITCHCOCK, OF NEW YORK, N. Y.

IMPROVEMENT IN THE MODE OF ATTACHING FOOT-TREADLES, &c.

Specification forming part of Letters Patent No. 188,739, dated March 27, 1877; application filed September 7, 1876.

*To all whom it may concern:*

Be it known that I, ALONZO HITCHCOCK, of the city, county, and State of New York, have invented an Improved Mode of Attaching Foot-Treadles, such as are used in sewing-machines, to the cross-bars or bearings, and also where the end of a pitman or connecting-rod is attached to the end of the treadle, of which the following is a specification:

In the first instance, the cross-bar is made with an ordinary screw-thread, that fits moderately tight in a female thread that is cut in the lugs or brackets commonly made on the treadles in sewing-machines or analogous machines. This screw fulcrum or bearing gives a slight lateral motion to the treadle as it vibrates up and down, according to the extent of motion of the treadle or pitch of the screw; but it requires no side pins or guides to keep it in place as commonly used, the screw-thread being sufficient to prevent all movement, thereby preventing all noise and jar, which is so troublesome and annoying in the common treadle; and, moreover, if it is necessary to readjust the treadle after use, when it may be somewhat worn, it is only necessary to give the cross-bar a half or a quarter turn, and new surfaces will be brought in contact, and the new bearing thus formed is as tight as when first made.

Figure 1:
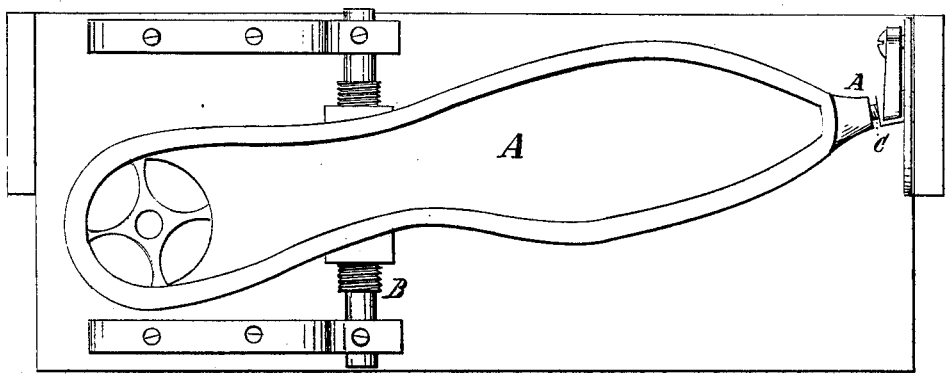
Figure 2:
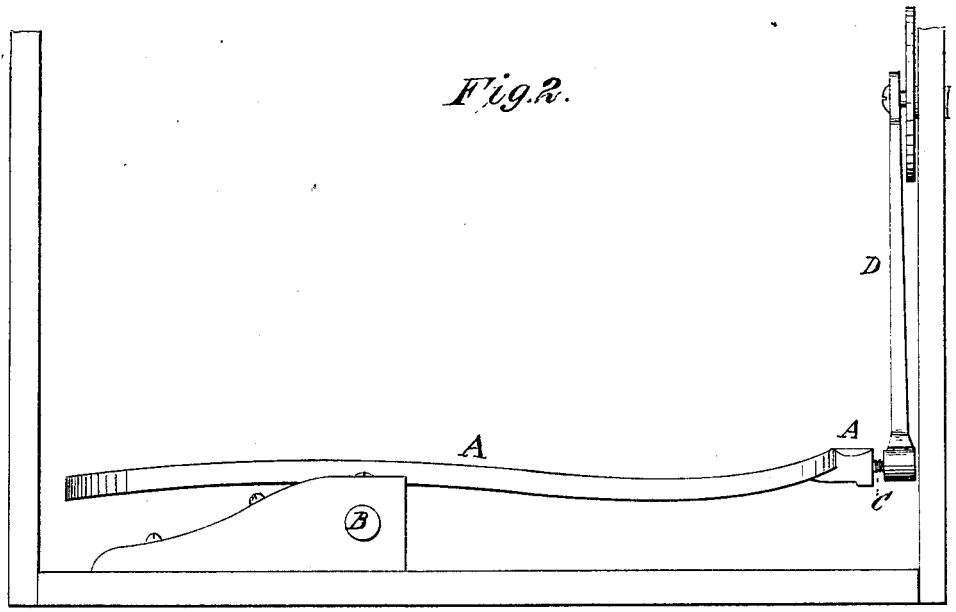

The same principle is found in the connection at the toe of the treadle A, Figure 1, where the screw C is used in the place of a plain pin or other connections. In this case a thread is tapped into the toe of the treadle, and the screw C vibrates in it, as shown in Fig. 2 in cross-section. Here, as in the first case, there is slight motion in the direction of the screw, according to the extent of the vibratory motion, and the same freedom from the noise and shackling unavoidable in the plain pin, and the same advantage in readjusting it when it wears loose.

The lower end of the pitman D is attached to the end of the screw-pin C, in the ordinary manner, with a simple pin passing through the end or head of the screw C, and a tenon on the end of the pitman D, or by any other suitable device, although the same principle may be applied in this vibrating joint that has been described in the two previous cases.

Fig. 1 is an upper plan view of the treadle and connections, A representing the treadle itself; B, the cross-bar with the screw-thread; C, the screw-pin, to which the pitman is attached.

Fig. 2 is a front elevation of the treadle, &c.

These screw-fulcrums, as described above, are especially well adapted to independent treadles attached to the same wheel or crank, as patented by me July 7, 1868, No. 79,572; and they are equally well adapted to various kinds of machinery where a slight vibratory motion is required without absolute accuracy.

I claim—

A bearing for treadles or connection-rods, when such bearings or connection is made substantially as set forth.

ALONZO HITCHCOCK.

Witnesses:
HARLYN HITCHCOCK,
THOMAS C. CONNOLLY.